United States Patent
Mears et al.

(10) Patent No.: US 7,209,187 B2
(45) Date of Patent: Apr. 24, 2007

(54) SYSTEM FOR SELECTIVELY EXTINGUISHING A LIGHT SOURCE THAT ILLUMINATES A TELEVISION POWER BUTTON

(75) Inventors: Mark Gilmore Mears, Zionsville, IN (US); Thomas Edward Gospel, Carmel, IN (US); Gene Harlow Johnson, Carmel, IN (US); Wesley Guy Munson, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 496 days.

(21) Appl. No.: 10/020,421

(22) Filed: Dec. 13, 2001

(65) Prior Publication Data

US 2002/0186325 A1  Dec. 12, 2002

(51) Int. Cl.
*H04N 5/63* (2006.01)
*H04N 5/445* (2006.01)

(52) U.S. Cl. .............. 348/730; 348/180; 348/569; 348/801; 455/226.4; 340/7.32

(58) Field of Classification Search ........... 348/730, 348/569, 748, 744, 800, 801, 180; 315/169.3, 315/160, 411; 345/84, 82, 76, 207; 349/8, 349/61; 455/226.4; 340/7.32
See application file for complete search history.

(56) References Cited

U.S. PATENT DOCUMENTS

| | | | | |
|---|---|---|---|---|
| 4,989,081 A | * | 1/1991 | Miyagawa et al. | 348/61 |
| 5,136,397 A | | 8/1992 | Miyashita | |
| 5,548,832 A | * | 8/1996 | Karam | 455/226.4 |
| 5,612,749 A | * | 3/1997 | Bacher et al. | 348/552 |
| 5,936,679 A | * | 8/1999 | Kasahara et al. | 348/553 |
| 6,081,902 A | * | 6/2000 | Cho | 713/330 |
| 6,161,156 A | * | 12/2000 | Suzuki et al. | 710/300 |
| 6,224,216 B1 | * | 5/2001 | Parker et al. | 353/31 |
| 6,456,421 B1 | * | 9/2002 | Chapnik et al. | 359/292 |
| 6,556,971 B1 | * | 4/2003 | Rigsby et al. | 704/270 |
| 6,593,972 B1 | * | 7/2003 | Johnson, Jr. | 348/473 |
| 6,704,061 B2 | * | 3/2004 | Mears et al. | 348/730 |
| 6,725,064 B1 | * | 4/2004 | Wakamatsu et al. | 455/566 |
| 6,731,958 B1 | * | 5/2004 | Shirai | 455/574 |
| 6,829,494 B2 | * | 12/2004 | Tanabe | 455/574 |
| 7,117,019 B2 | * | 10/2006 | Abbasi | 455/566 |
| 7,124,313 B1 | * | 10/2006 | Motohashi | 713/324 |

FOREIGN PATENT DOCUMENTS

EP  1168288  1/2002

OTHER PUBLICATIONS

Patent Abstracts of Japan, vol. 2000, No. 1, Jan. 31, 2000 & JP 11-289502.
Patent Abstracts of Japan, vol. 1999, No. 13, Nov. 30, 1999 & JP 11-220678.

* cited by examiner

*Primary Examiner*—David Ometz
*Assistant Examiner*—Jean W. Désir
(74) *Attorney, Agent, or Firm*—Joseph J. Laks; Robert D. Shedd; Reitseng Lin

(57) ABSTRACT

A system for selectively illuminates a light source that illuminates a power indicator of a video apparatus when the indicator distracts a viewer. The power button illumination is selectively set to be extinguished or illuminated when the video apparatus is powered on by means of an on-screen menu as an example. Extinguishing the power button light source does not affect the ability of the indicator to become illuminated to provide information to a viewer regarding the operating status of the video apparatus such as when a TV projection lamp has failed.

9 Claims, 2 Drawing Sheets

SYSTEM FOR SELECTIVELY EXTINGUISHING A LIGHT SOURCE THAT ILLUMINATES A TELEVISION POWER BUTTON

FIELD OF INVENTION

The present invention pertains to televisions, and more particularly to a system of allowing a user to selectively turning off a power indicator light. In addition, this power indicator light may also be used for indicating the operating status of an apparatus such as a television system, even if the user has selected it to be turned off.

BACKGROUND OF THE INVENTION

A video apparatus such as for example, televisions (TVs) that employ Liquid Crystal On Silicon (LCOS) or other projection technology have a viewer-replaceable lamp that creates the light of the projected picture. Certain of these televisions have a power button on their front that is illuminated with a light source, such as an LED, when the TV is powered on. When the lamp is dead, no on-screen display can be projected onto the screen to indicate the reason for the loss of picture. Conventional systems have attempted to indicate that the lamp is dead through visual indicators, typically by employing a blinking LED to indicate lamp status.

For example, Thomson Model 40RW34E LCD TV sold in Europe employs three LEDs on its front, which depending on whether each LED is on, off, or blinking, indicates information regarding the operating status of the TV, such as that the lamp does not work. For the "lamp does not work" indicator, all three LEDs blink.

SUMMARY OF THE INVENTION

The present inventors recognize that it would be desirable to be able to allow a user to selectively turn off the power indicator light even thought the system is on. This allows a viewer to remove the power indicator light source if he or she finds the light source to be distracting. This is especially helpful when a viewer likes to view a program in a darken room.

Therefore, a system is proposed for selectively extinguishing a power indicator light source if the light source is distracting to a viewer. In addition, extinguishing the power button light source does not affect the ability of the light source to become illuminated to provide information to a viewer regarding the operating status of a video apparatus, such as, for example, indicating that a TV lamp has failed.

DETAILED DESCRIPTION OF THE INVENTION

Figure 1:
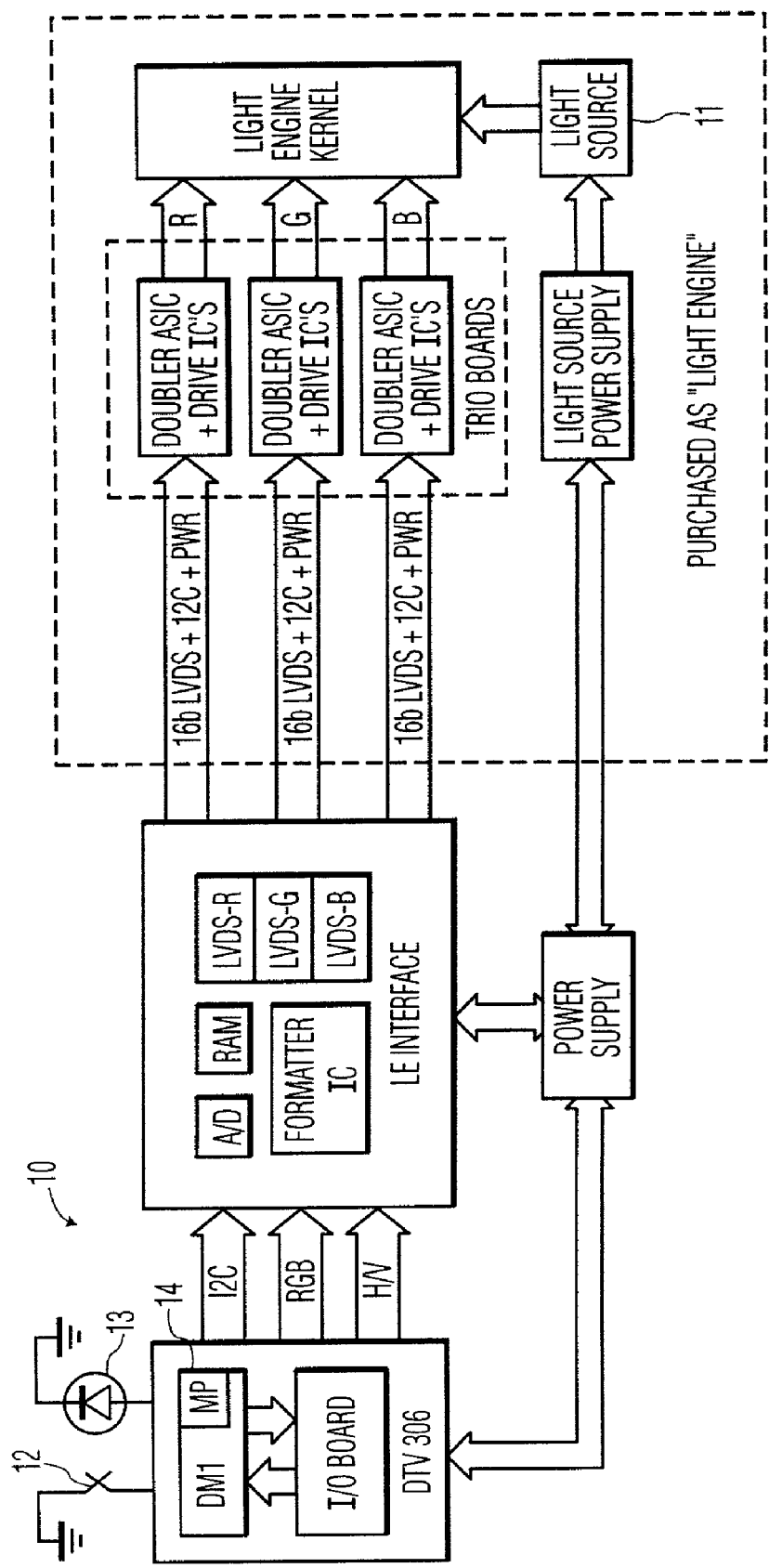
FIG. 1 shows a block diagram of an LCOS projection television employing the system for extinguishing the illumination of the power button according to the present invention.

FIG. 1 shows a block diagram of an LCOS projection television (TV) 10 having a viewer replaceable light source 11, e.g., a TV lamp, and a power button 12 that is selectively illuminated by a light source 13, such as an LED. The illumination of the power button is selectively controlled through a microprocessor 14 and an on-screen menu selection according to the present invention.

Figure 2:
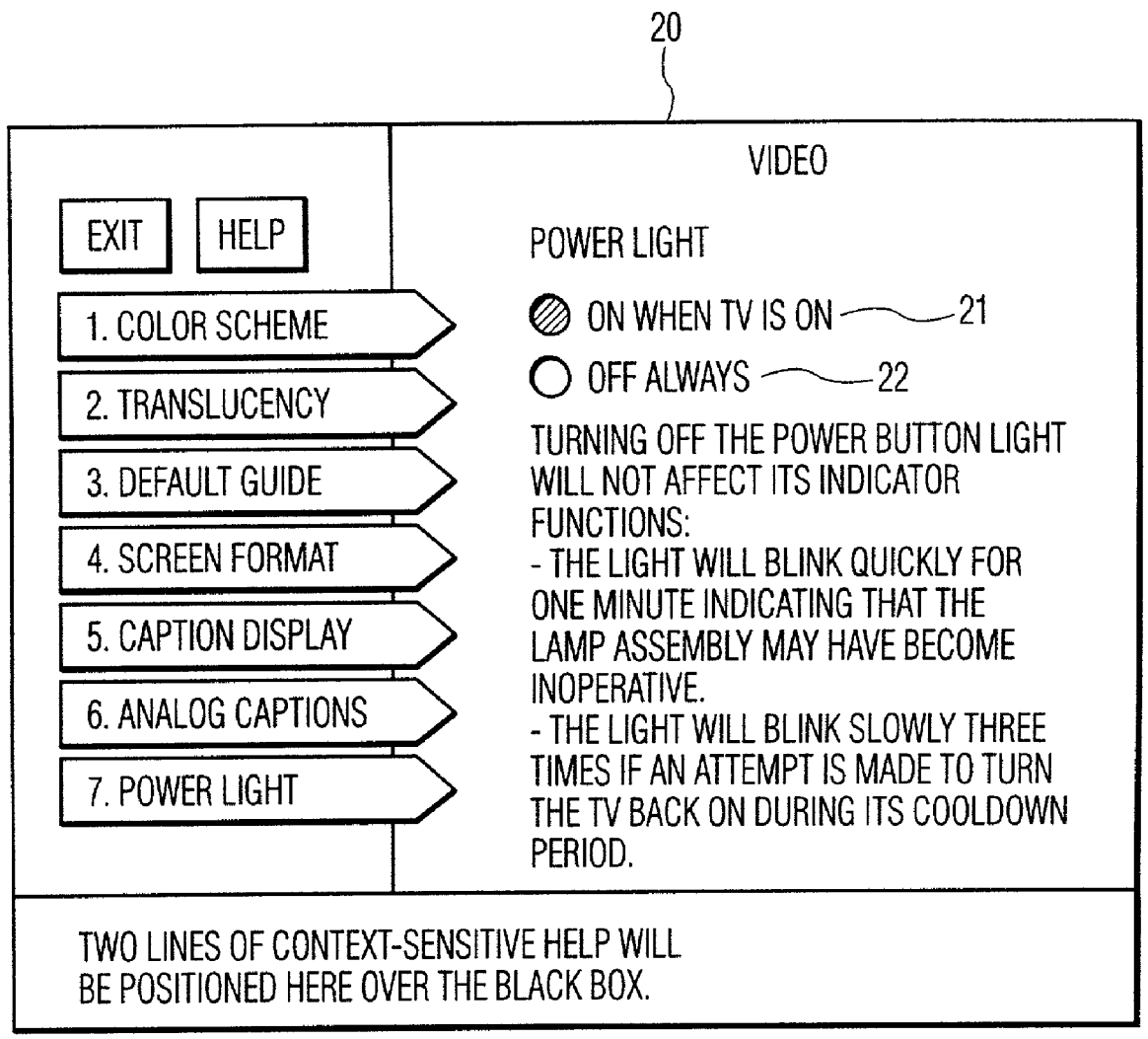
FIG. 2 shows an on-screen menu that can be used for selectively illuminating the power button of the TV shown in FIG. 1.

FIG. 2 shows an example of such a menu 20. Should the viewer not want the power button on the front of the television to be continuously illuminated when the TV is on, the viewer can use the TV's on-screen menu 20 to turn off the LED.

The "On When TV Is On" setting 21 in the menu 20 turns the LED 13 on only when the TV is powered on. The "On When TV Is On" setting 21 is preferably the default setting. The power button light setting is retained permanently even at power cycle or power removal. When the setting is changed between "On When TV Is On" 21 and "Off Always" 22, or vice versa, the change instantly takes effect, i.e., the TV does not need to be turned off and then back on for the change to take effect.

In another aspect of the present invention, if the power button menu 20 is set to "Off Always" to disable the power button LED 13, it does not disable the other indicator functions of the LED. For example, the power button LED 13 can still be illuminated to indicate different information regarding the status of the TV, such as when, for example, the TV lamp is dead, an attempt to restart the TV lamp has failed, or the TV lamp is in its cool down mode and can therefore not be turned back on immediately.

The system of the present invention may use any number of LEDs to both selectively illuminate the power button and serve as indication of the operating status of a video apparatus. Of course, at least one LED can be selectively programmed to blink for different periods of time, a different number of times and/or at a different speed to indicate different operating information regarding the status of the TV lamp. The duration, speed and number of times the at least one LED blinks are each selectively controllable. They can be selectively programmed by the manufacturer when the TV is fabricated. In an alternative embodiment these items can be selectively set or varied by the viewer. The system is typically software controlled by a programmable microprocessor, microcontroller or microcomputer, as represented by element 14 of FIG. 1.

A system according to one aspect of the present invention can operate as follows. When the system detects that the TV lamp 11 has burned out, the power button LED 13 will blink at an attention-getting rate, e.g., on for 200 msec, off for 200 msec, and then repeat. The assumption is that all other systems continue to operate normally (audio is heard, channels can be changed, power remains on, etc.) which will enable the viewer to diagnose the problem as an expired lamp module. This is advantageous because if the software turned off the television when the lamp module burned out, that would only further confuse the viewer since they might wrongly believe that a power surge, bad power supply or some other failure caused the picture to go out instead of the TV lamp.

The blinking LED 13 in combination with the loss of picture will indicate to the viewer that something undesirable has occurred and that the viewer should read the viewer manual or call a service center for advice. Due to the possibility of false positives, e.g., the power button LED coming on when the lamp is actually working, the LED should blink only for one minute. However, if the TV is turned off, the blinking also stops. If the consumer tries to turn the TV on again when the TV is already on and the lamp has burned out, then the LED will blink for another minute.

Under normal operation, the power button LED does not blink in response to IR commands.

The power button LED also illuminates when a TV is in "cool down" mode. Cool down mode is at a time after the viewer has sent a power-off command to the TV and the TV cannot be turned back on instantaneously. This occurs because the high-intensity lamp of the TV must first de-energize before it can be relit otherwise the lamp life is shortened. When a power-on, power-off, or power-toggle command is received by the TV during the TV cool down mode, the power button LED can be made to blink slowly, e.g., 500 msec on/off three times, to let the viewer know that the command was received but the TV cannot act upon the command immediately.

A system according to another aspect of the present invention can also include a "lamp restart failed" indicator. Before the TV determines that the lamp has failed, it will try three times to restart the lamp. Each time that it attempts to restart the lamp without success, a power button LED 13 can be made to blink, e.g., 5 times slowly, to indicate that lamp restart was unsuccessful. It will take three lamp restart attempts and up to a minute before the TV determines that the lamp may have failed and indicates this to the viewer by flashing the power button LED at a fast rate for one minute as described above. In summary, Table 1 below shows examples of different lamp status indicators that may be provided by the power button LED according to the present invention.

TABLE 1

| Indicator Name | Blinks of Power Button LED | Speed of blinking |
|---|---|---|
| Lamp restart failed | Five blinks | "Fast" (200 msec on/off) |
| Dead lamp | One minute of blinks | "Fast" (200 msec on/off) |
| Cannot restart TV during cool down mode | Three blinks | "Slow" (500 msec on/off) |

The system of the present invention for selectively illuminating a power button can also be used in other devices to indicate information regarding the operating status of said device such as computers, stereos, medical equipment, manufacturing equipment, etc. In addition, the illumination source is not limited to LED, but may be an LCD display or other information display device.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention, and the exclusive use of all modifications which come within the scope of the appended claims, is reserved.

What is claimed is:

1. A system for indicating the status of a video apparatus, comprising:
   a power indicator illumination; and
   a user interface, wherein the user interface is operative to allow a user to select one of first and second modes of operation, in the first mode of operation, the power indicator illumination is automatically turned on whenever the video apparatus is powered on and remains turned on continuously while the video apparatus is powered on, and in the second mode of operation, the power indicator illumination is turned off when the video apparatus is powered on.

2. The system of claim 1 wherein in the second mode of operation, a processor is adapted to illuminate the power indicator illumination to provide information to the user regarding operating status of the video apparatus.

3. The system of claim 1, wherein the illumination is at least one light emitting diode (LED).

4. The system of claim 1, wherein the user interface comprises an on-screen menu.

5. The system of claim 4 further comprising a microprocessor for controlling the illumination in response to information entered by the user on the on-screen menu.

6. The system of claim 2, wherein the illumination blinks at a plurality of different speeds, each speed indicating a different one of a plurality of operating status of the video apparatus.

7. The system of claim 2, wherein the operating status of the video apparatus comprising at least one of following conditions: non-operating projection lamp and cooling down of projection lamp.

8. A method of controlling a power indicator illumination of an apparatus, comprising the steps of:
   providing a user interface for allowing a user to select one of first and second modes of operation;
   receiving a selection from the user;
   if the selection indicates the first mode of operation, turning on the power indicator illumination whenever the apparatus is powered on and keeping the power indicator illumination turned on continuously while the apparatus is powered on; and
   if the selection indicates the second mode of operation, turning off the power indicator illumination when the apparatus is powered on.

9. The method of claim 8 further comprising the step of illuminating the power indicator illumination of the apparatus to provide information to the user regarding status of the video apparatus, even if the selection indicates the second mode of operation.

* * * * *